F. A. HANKS.
ANGLE INDICATOR FOR USE IN GUN LAYING AND FIRING AND FUSE TIMING.
APPLICATION FILED MAY 31, 1916.
1,363,866.
Patented Dec. 28, 1920.
2 SHEETS—SHEET 1.
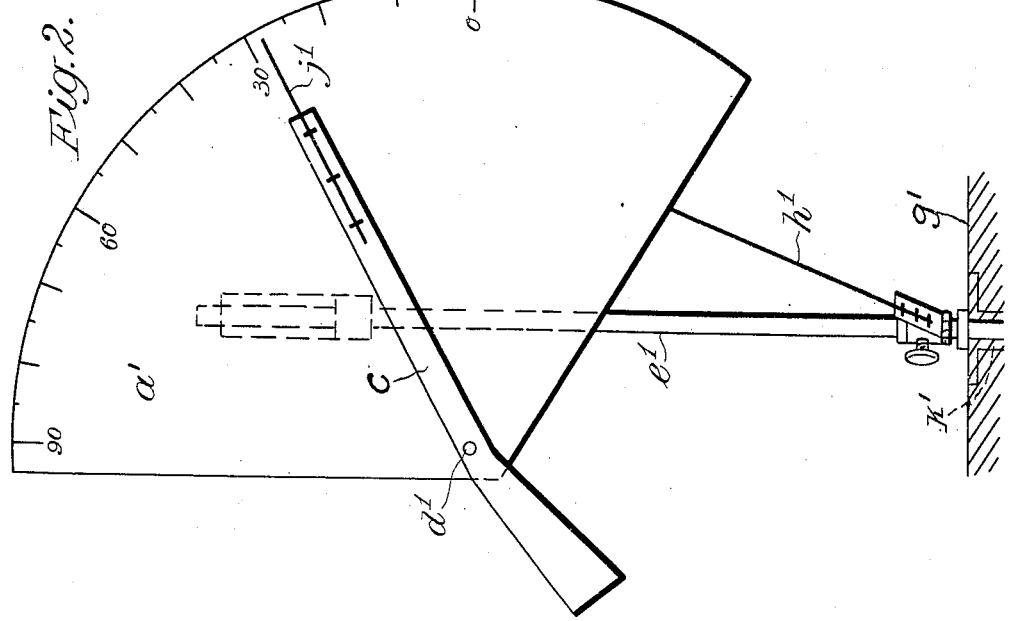
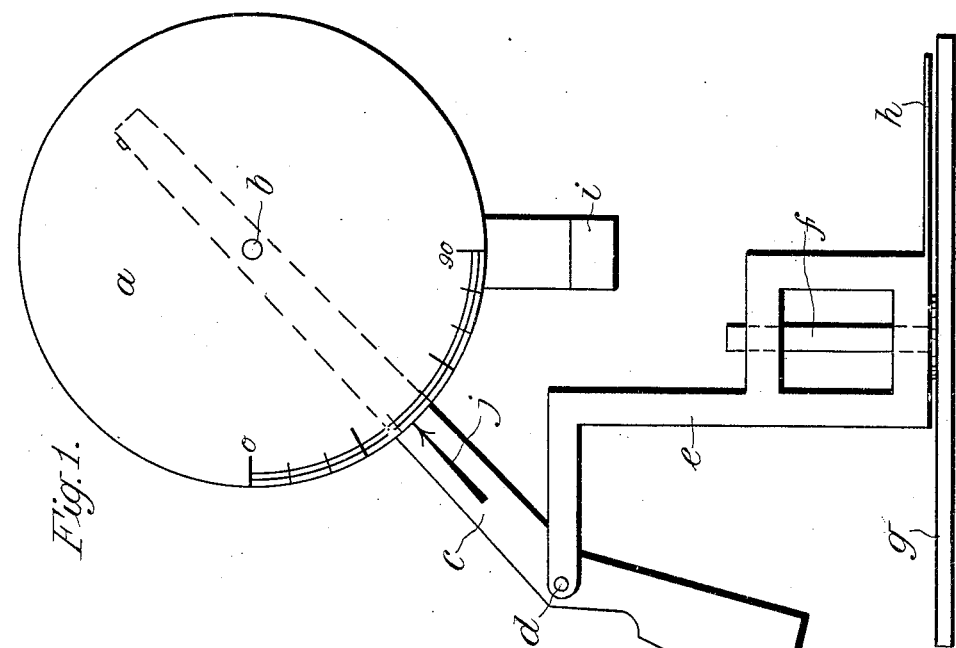
Witnesses
Inventor
Frederick A. Hanks,
By
Atty.

F. A. HANKS.
ANGLE INDICATOR FOR USE IN GUN LAYING AND FIRING AND FUSE TIMING.
APPLICATION FILED MAY 31, 1916.
1,363,866.
Patented Dec. 28, 1920.
2 SHEETS—SHEET 2.
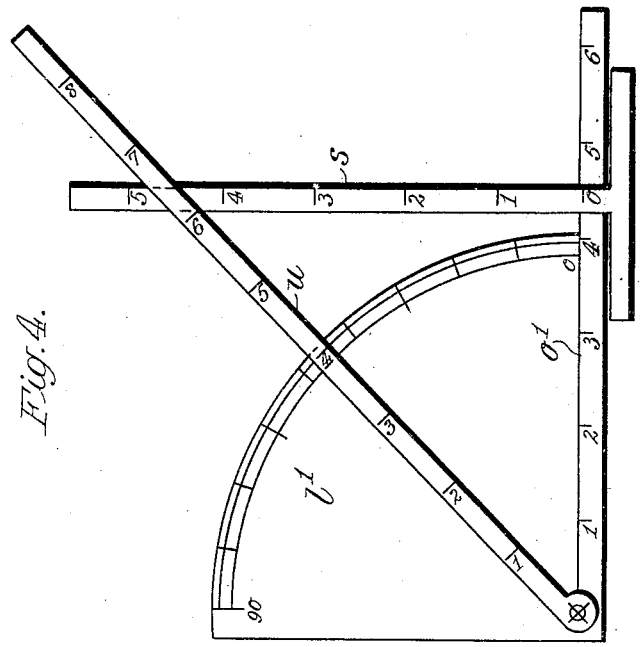
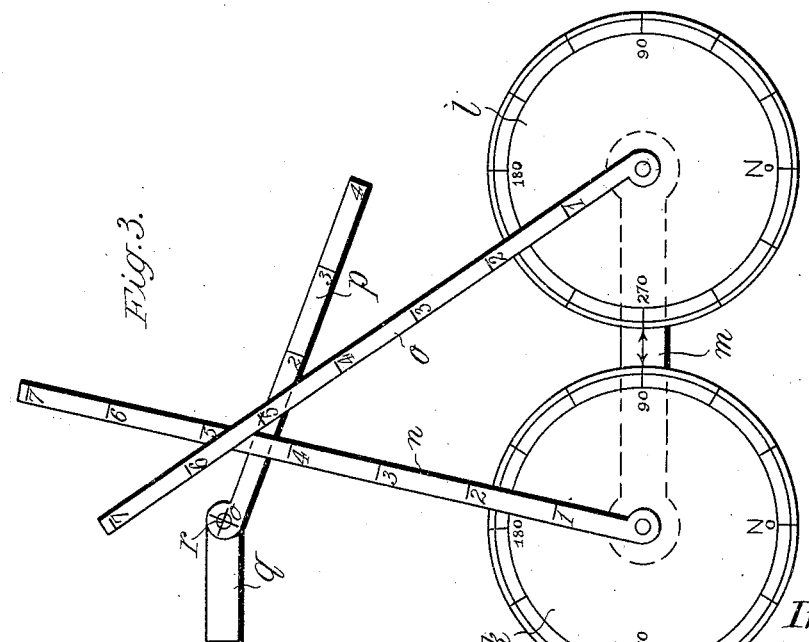
Witnesses.
Inventor
Frederick A. Hanks,
By
Atty.

UNITED STATES PATENT OFFICE.

FREDERICK ARCHER HANKS, OF NUNHEAD, ENGLAND.

ANGLE-INDICATOR FOR USE IN GUN LAYING AND FIRING AND FUSE-TIMING.

1,363,866.  Specification of Letters Patent.  Patented Dec. 28, 1920.

Application filed May 31, 1916. Serial No. 101,001.

*To all whom it may concern:*

Be it known that I, FREDERICK ARCHER HANKS, a subject of His Majesty the King of England, and resident of Nunhead, in the county of London, Kingdom of England, have invented certain new and useful Improved Angle-Indicators for Use in Gun Laying and Firing and Fuse-Timing, of which the following is a specification.

This invention relates to an improved angle indicator for use in gun-laying, firing and fuse-timing.

The indicator is adapted for use on land or sea and with stationary or moving targets but it is especially suitable for use in connection with aerial or elevated targets such as flying machines as it gives the horizontal and vertical angles, the required amount of elevation, the fuse time, and also the height, speed, and direction of the target.

The invention is illustrated in, and hereinafter described with reference to the accompanying drawings, in which:—

Figure 1 is a diagrammatic side elevation of a vertical angle indicator;

Fig. 2 is a similar view of a slightly modified form of angle indicator;

Fig. 3 is a diagrammatic plan view of a miniature table or chart comprising a pair of spaced dials and graduated arms and showing also the direction indicator; and Fig. 4 is a diagrammatic side elevation of an instrument for use when a target is an aerial one to indicate the horizontal distance, the height and the actual distance of the target as well as the fuse time.

According to the present invention the horizontal and vertical angles of the target are taken from two positions or stations which may be regarded as the ends of a known base line by means of an angle indicator which may be of the form shown in Figs. 1 or 2. If a gun is to be used at only one station then the vertical angle of the target need not be taken for the distant station and the distant reading may be confined to the horizontal angle which is communicated by telephone or otherwise to the home station, but if a gun is to be used at both stations then both the horizontal and vertical angles are communicated from one station to the other. The horizontal readings when taken and received are suitably plotted on the miniature or chart shown in Fig. 3 and then for the sake of simplicity the actual horizontal distance is transferred to the indicator shown in Fig. 4 from which the height, the actual distance and the fuse time can be ascertained.

The angle indicator shown in Fig. 1 comprises a vertical dial or quadrant $a$ which is pivotally mounted at $b$ to an indicator or arm $c$ of rifle shape connected by a pivot $d$ to a framework or support $e$. This framework $e$, indicator or arm $c$ and dial $a$ are free to turn about a vertical pivot $f$ on a perfectly level stand or dial $g$. A pointer $h$ is rigidly fitted to the framework $e$ so as to revolve over the face of the flat dial $g$ to record the horizontal angle of the target. For use by moving troops or when there is often no time to level the stand or dial $g$ this form of indicator is specially suitable as the dial $a$ is weighted at $i$ and is free to swing on its pivot $b$ so that when the indicator or arm $c$ is pointed to the target the pointer $j$ will record the angles. But for fort or permanent station use, the dial or quadrant $a$ may, as shown by way of a modification in Fig. 2, be fixed as regards rotation in its own plane and be mounted upon a vertical pivot or rod $e'$ the end of which is adapted to fit into and revolve in a socket $k'$, provided at the center of the fixed dial $g'$ which in this case may conveniently be painted or marked on a suitable concrete platform in the fort. In this arrangement the indicator or arm $c'$ is pivotally connected at $d'$ to the center of the dial or quadrant $a'$ so that the pointer $j'$ on the end of the rifle sight points to the vertical angle of the target as will be readily understood. The pointer $h'$ is preferably as shown hinged to its supporting rod $e'$ so that it can be folded up flat with the rod $e'$ when the dial is stored away or out of use. In Fig. 2 the pointer $h'$ is indicated as folded part of the way toward the rod $e'$. Thus the horizontal and vertical angles of sight of the target are simultaneously obtained from two stations at a known distance apart and the horizontal angle is communicated from the distant to the home station where only one gun is used or where two are used both the horizontal and vertical angles are exchanged by the station commanders. At each gun station is provided a miniature table or chart such as is shown in Fig. 3 and preferably also for convenience another or separate instrument such as that shown in Fig. 4. The device shown in Fig. 3 comprises a pair of dials $k$ $l$ arranged at the ends of a pivoted connecting link $m$ which serves to keep them at a predetermined distance apart. These dials are set by compass to indicate in miniature the home and the distant stations from which the angles of the target are taken. Mounted to turn about the pivots of these dials $k$ and $l$ or to otherwise coöperate therewith are two graduated arms or rods $n$ and $o$ which are extended over the dials and as the distance graduations on these arms or rods correspond to the scale of the known base length the place where the arms intersect after they have been moved over the dials will indicate on the arms or rods the actual horizontal distances of the target from the two positions.

In the case of a moving target a speed and direction indicator is provided comprising a graduated arm or rod $p$ connected to a base or finger piece $q$. This rod is placed with its zero position or pivot point $r$ on the point where the graduated arms $n$ and $o$ intersect. At a predetermined time interval say 20 or 40 seconds later according to the distance of the target a further set of readings are taken from the two stations and the graduated arms $n$ and $o$ are moved to corresponding angular positions in the manner before described and the arm or rod $p$ of the speed and direction indicator—without moving the base $q$—is turned till its graduated edge corresponds to the new point where the arms $n$ and $o$ intersect. This point constitutes the second position of the target and the arm $p$ will indicate its horizontal direction of movement. To obtain the third or firing spot to which the gun is to be directed the distance between the first and second positions is doubled or otherwise multiplied as desired and the measured arms $n$ and $o$ are then moved to this new or third position. The gun, or guns, are then laid to the angles indicated on the dials $k$ and $l$ by their respective measured arms $n$ and $o$ and they are fired at the doubled time less the fuse time allowance. For example if 40 seconds are allowed between the first and second readings of the indicators and if the fuse time allowance is 15 seconds the guns will be fired at the third position 25 seconds after the fuse reading is taken so that the shell will burst at the spot where the target is arriving at the end of the second period of time.

Should the target be an aerial one the procedure will be exactly the same except that a graduated arm or a plane perpendicular member $s$ shown in Fig. 4 is placed on a graduated arm $o'$—corresponding to the graduated arms $n$ or $o$ of Fig. 3—with its zero indication against the horizontal distance on the arm $o'$ which is indicated on the arms $n$ or $o$ as the case may be for either of the stations. The graduated arm $o'$ is suitably formed as an integral part of a dial $l'$ by means of which and by the aid of another graduated arm $u$ the vertical angle of the target is plotted so that the place where the arm $u$ and the line $s$ intersect will indicate the actual distance on the arm $u$ and the height of the target on the arm $s$. In practice the arm $u$ would be graduated to give the fuse times for the distances indicated in accordance with the particular gun with which the instruments are to be used. It will be obvious that if desired a separate instrument such as that shown in Fig. 4 need not necessarily be provided as the readings obtained therefrom can be got by arranging the arm $s$ on either of the arms $n$ or $o$ and by using the dials $k$ and $l$ in conjunction with a separate graduated arm in place of the arm $u$, but for the sake of convenience it is preferable to have a separate instrument. The horizontal distance arm $o'$ would also be graduated to give the angles of elevation for the gun used in addition to or in place of the distance measurements.

In use guns should be elevated to the horizontal distance in addition to the vertical angle of sight. Fuses should be timed to the actual distance and not the horizontal distance.

What I claim is:—

1. An indicating apparatus of the character described, comprising a pair of joined spaced dials, a pair of graduated arms pivotally mounted, one over each of said dials, and adapted to be moved over the respective dials to indicate the horizontal angles of a target taken from two known positions, and a direction indicator coöperating with said arms at their points of intersection and adapted to indicate the direction of movement of the target.

2. An indicator of the character described, comprising a pair of spaced joined graduated dials, a pair of graduated arms pivotally mounted, one over each of said dials, and adapted to be moved over the respective dials to indicate the horizontal angles of a target taken from two known positions, and a base carrying a pivotally mounted graduated member arranged transversely of and coöperating with the arms at their points of intersection and adapted to indicate the direction of movement of the target, as well as the speed.

3. An indicating apparatus of the character described, comprising a pair of graduated dials, a link for joining them at a predetermined distance apart, a pair of arms pivotally mounted, one over each of said graduated dials, and adapted to be moved over the respective dials to indicate the horizontal angles of a target taken from two known positions, a base separate from the dials, and a third graduated member pivotally supported on the base and serving as a direction and speed indicator in coöperation with said graduated arms.

In testimony whereof I have signed this specification.

FREDERICK ARCHER HANKS.